United States Patent
Chen (10) Patent No.: US 8,836,517 B2
(45) Date of Patent: Sep. 16, 2014

(54) METHOD AND SYSTEM FOR MONITORING THE THERMAL DISSIPATION OF A COMPUTER PROCESSING UNIT

(75) Inventor: Yi-Peng Chen, Taipei (TW)

(73) Assignee: NVIDIA Corporation, Santa Clara, CA (US)

(*) Notice: Subject to any disclaimer, the term of this patent is extended or adjusted under 35 U.S.C. 154(b) by 1707 days.

(21) Appl. No.: 11/936,043

(22) Filed: Nov. 6, 2007

(65) Prior Publication Data

US 2009/0115619 A1    May 7, 2009

(51) Int. Cl.
G08B 17/00    (2006.01)
G08B 23/00    (2006.01)
G08B 29/00    (2006.01)
G01K 3/00    (2006.01)
G06F 1/20    (2006.01)

(52) U.S. Cl.
CPC ..................................... *G06F 1/206* (2013.01)
USPC ........... 340/584; 340/500; 340/501; 340/511; 374/102; 374/110

(58) Field of Classification Search
USPC ......................................................... 340/584
See application file for complete search history.

(56) References Cited

U.S. PATENT DOCUMENTS

| | | | | |
|---|---|---|---|---|
| 4,484,050 A | * | 11/1984 | Horinouchi et al. | 219/712 |
| 5,612,677 A | * | 3/1997 | Baudry | 340/584 |
| 6,535,798 B1 | * | 3/2003 | Bhatia et al. | 700/293 |
| 7,467,318 B2 | * | 12/2008 | Bruno et al. | 713/500 |
| 7,617,020 B2 | * | 11/2009 | Chang et al. | 700/300 |
| 2005/0030171 A1 | * | 2/2005 | Liu et al. | 340/500 |

\* cited by examiner

*Primary Examiner* — Kerri McNally
*Assistant Examiner* — John Mortell
(74) *Attorney, Agent, or Firm* — Patterson & Sheridan, LLP (57) ABSTRACT

A method and system are implemented for monitoring the thermal dissipation from a computer processing unit. The system comprises a temperature sensor, and a temperature controller. The temperature controller is configured to set a temperature observation window in a first temperature range, gradually narrow the observation window from the first temperature range after a monitored temperature of the processing unit has entered the observation window, and issue an alert signal when the monitored temperature exits the observation window.

26 Claims, 7 Drawing Sheets

METHOD AND SYSTEM FOR MONITORING THE THERMAL DISSIPATION OF A COMPUTER PROCESSING UNIT

BACKGROUND OF THE INVENTION

1. Field of the Invention

The present invention generally relates to a computer device, and more particularly a system and method for monitoring the thermal dissipation of a computer processing unit to prevent its overheating in operation.

2. Description of the Related Art

Unless otherwise indicated herein, the approaches described in this section are not prior art to the claims in this application and are not admitted to be prior art by inclusion in this section.

As the semiconductor technology advances, integrated circuit chips of higher processing power are integrated in computer systems. Nowadays, certain computer systems may typically include a central processing unit ("CPU") in charge of the general computing operations, and one or more graphics processing unit ("GPU") specifically dedicated to process graphics data to render display images. As a result of the increased processing power provided by the CPU and the GPU, a higher amount of heat that is produced must be dissipated by the cooling devices associated with these processing units.

Figure 1A:
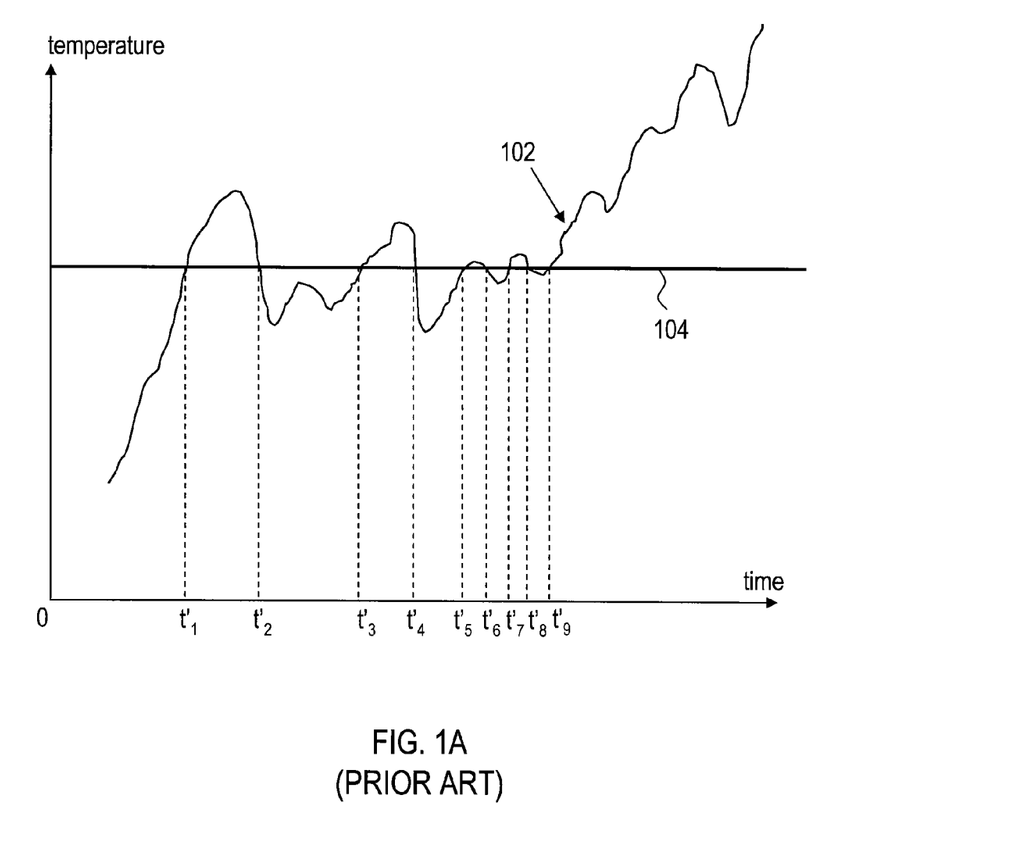
FIG. 1A is a schematic graph illustrating a known basic approach for monitoring a temperature of a processing unit to prevent its overheating.

To prevent overheating of a processing unit in operation, FIG. 1A is a schematic graph illustrating a known basic approach for monitoring a temperature 102 of a processing unit. The illustrated approach sets a temperature threshold 104 that is used as trigger condition to indicate when enhanced cooling measures are required to prevent overheating of the processing unit. When the monitored temperature 102 passes above the temperature threshold 104, such as at time $t'_1$, $t'_3$, $t'_5$, $t'_7$ and $t'_9$, an interrupt signal is generated to indicate that enhanced cooling measures are required to increase the thermal dissipation of the processing unit. In contrast, when the monitored temperature 102 drops below the temperature threshold 104, such as time $t'_2$, $t'_4$, and $t'_6$ and $t'_8$, another interrupt signal is outputted to indicate that enhanced cooling measures may be deactivated to save power consumption. This approach can be inefficient to cool down the processing unit, especially when the monitored temperature 102 fluctuates substantially along the temperature threshold 104, causing many interrupt signals to be issued.

Figure 1B:
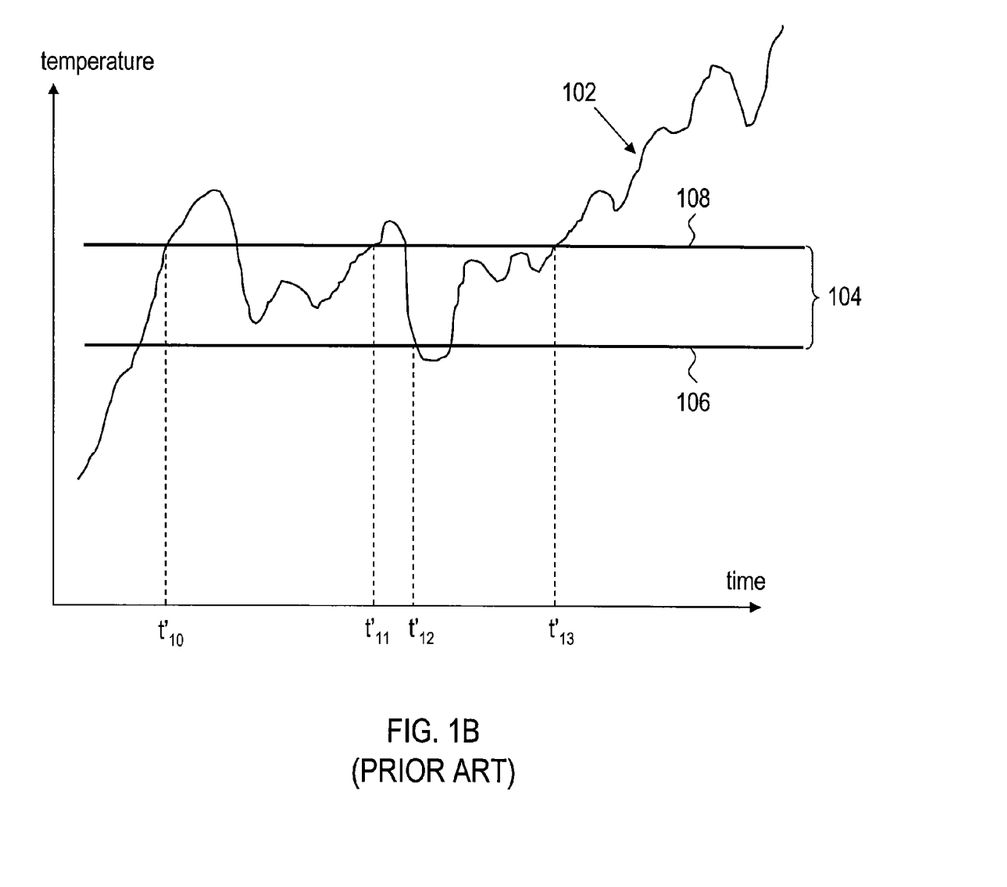
FIG. 1B is a schematic graph illustrating another known approach for monitoring a temperature of a processing unit to prevent its overheating.

To remedy the above problems, FIG. 1B is a schematic graph that illustrates another known approach for monitoring the temperature 102 of a processing unit. Instead of a single temperature threshold, a buffer temperature range 104 is used to monitor the temperature 102. The range 104 is defined between a lower temperature threshold 106 and an upper temperature threshold 108. When the monitored temperature 102 exceeds the upper temperature threshold 108, such as at time $t'_{10}$, $t'_{11}$ and $t'_{13}$, an interrupt signal is outputted to indicate that enhanced cooling measures are required to prevent overheating of the processing unit. These enhanced cooling measures may be deactivated only when the monitored temperature 102 drops below the lower temperature threshold 106, such as at time $t'_{12}$.

Unlike the excessive interrupts generated with the method shown in FIG. 1A, less interrupt signals are likely generated with the method shown in FIG. 1B, especially if the range 104 is set to be wide. However, the detection of the monitored temperature 102 exceeding the upper temperature threshold 108 of the range 104 consequently occurs later in time, and so is the generated interrupt. As a result, the response time to activate the necessary cooling measures may not be sufficiently fast to prevent overheating. On the other hand, if the range 104 is set to be too narrow, then the similar problem of generating excessive interrupts may occur again.

Therefore, what is needed is a system and method that can monitor the temperature of a processing unit in an efficient manner, and address at least the problems set forth above.

SUMMARY OF THE INVENTION

In one embodiment, the present invention describes method for monitoring a thermal dissipation from a processing unit. The method comprises setting an observation window in a first temperature range, gradually narrowing the observation window from the first temperature range after a monitored temperature of the processing unit has entered the observation window, and issuing an alert signal when the monitored temperature exits the monitored range.

In another embodiment, a system for monitoring a thermal dissipation from a processing unit is disclosed. The system comprises a temperature sensor, and a temperature controller configured to set a temperature observation window in a first temperature range, gradually narrow the observation window from the first temperature range after a monitored temperature of the processing unit has entered the observation window, and issue an alert signal when the monitored temperature exits the monitored range.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 2:
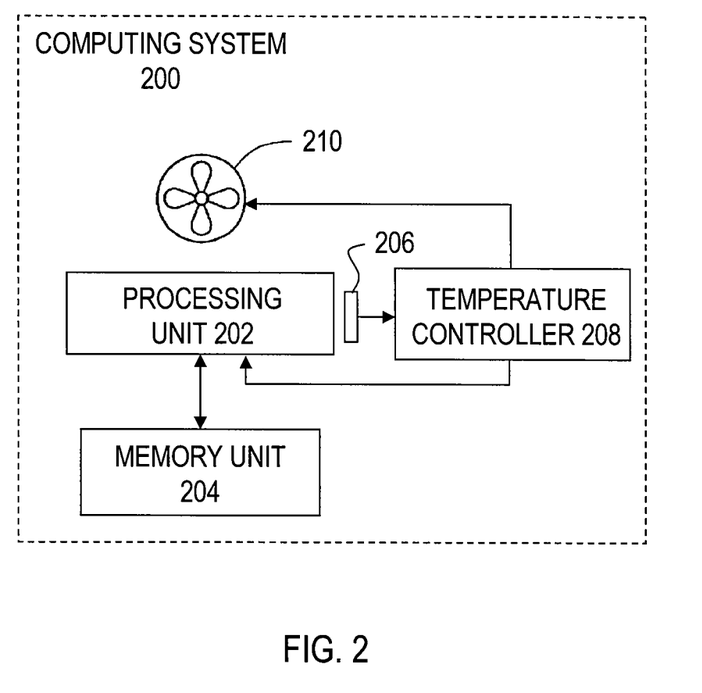
FIG. 2 is a simplified diagram of a computing system suitable for implementing one or more aspects of the present invention.

FIG. 2 is a simplified diagram of a computing system 200 suitable for implementing one or more aspects of the present invention. The computing system 200 includes a processing unit 202, and a memory unit 204 coupled to the processing unit 202. In one embodiment, the processing unit 202 may be a graphics processing unit (GPU) of a graphics system configured to process instructions in order to render graphics data into images stored in the memory 204. In alternate embodiments, the processing unit 202 may be a central processing unit (CPU) configured to execute programming instructions and operate on data stored in the memory 204.

When the processing unit 202 operates, a significant amount of heat is generated from the processing unit 202. To control the temperature of the processing unit 202 and prevent its overheating, a temperature sensor 206 is placed in proximity of the processing unit 202. The temperature sensor 206 is coupled to a temperature controller 208, which receives a measure signal from the temperature sensor 206 indicating an actual temperature of the processing unit 202 to monitor. The temperature controller 208 may be coupled to an electric fan 210 that operates to create an air flow to cool down the processing unit 202. The rotation speed of the fan 210 may be adjusted in response to interrupt signals issued by the temperature controller 208 according to the actual amount of heat generated to suitably cool down the processing unit 202. The temperature controller 208 is also coupled to the processing unit 202, so that the processing unit 202 can suitably modify its processing speed in response to interrupt signals outputted by the temperature controller 208. To control the temperature of the processing unit 202, the temperature controller 208 sets a variable observation window in which the temperature of the processing unit 202 is monitored to determine when enhanced cooling measures have to be triggered to prevent overheating, such as by increasing the speed of the fan 210 and/or reducing the processing speed of the processing unit 202.

Figure 3A:
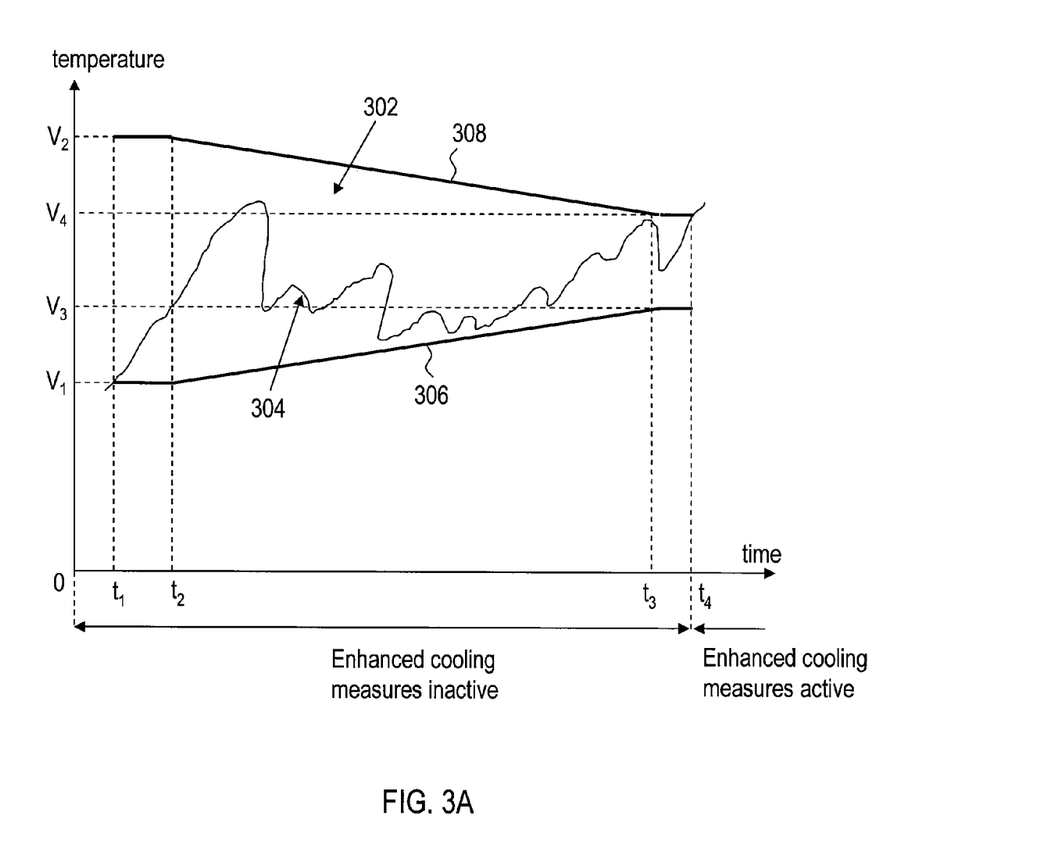
FIG. 3A is a schematic graph illustrating how a variable observation window is configured to monitor the temperature of a processing unit according to an embodiment of the present invention.

In conjunction with FIG. 2, FIG. 3A is a schematic graph illustrating how a variable observation window 302 is configured to monitor the temperature 304 of the processing unit 202, according to an embodiment of the present invention. The observation window 302 is defined between a lower temperature threshold 306 and an upper temperature threshold 308, which respectively set conditions for the temperature controller 208 to issue interrupt signals for either activating or deactivating enhanced cooling measures. In an initial stage of operation, the observation window 302 may be set in a large temperature range, with the lower temperature threshold 306 set to a value $V_1$ and the upper temperature threshold 308 to a value $V_2$. When the monitored temperature 304 is below the observation window 302, the lower temperature threshold 306 and upper temperature threshold 308 may be kept constant.

As the processing unit 202 operates, the monitored temperature 304 may increase and pass above the lower temperature threshold 306, which may occur at a time $t_1$, for example. In response to the detected passage of the monitored temperature 304 above the lower temperature threshold 306, the temperature controller 208 controllably narrows the observation window 302, which may occur at a programmed time interval after time $t_1$, such as at time $t_2$. While the observation window 302 narrows, no enhanced cooling measures are activated as long as the monitored temperature 304 does not exceed the upper temperature threshold 308. In the illustrated embodiment, the observation window 302 is narrowed by timely decreasing the upper temperature threshold 308 and timely increasing the lower temperature threshold 306 in a simultaneous manner. However, in alternate embodiments, the observation window 302 may also be narrowed by either only decreasing the upper temperature threshold 308 or increasing the lower temperature threshold 306. As long as the upper temperature threshold 308 is not exceeded, the observation window 302 gradually narrows until the lower and upper temperature thresholds 306 and 308 respectively reach preset values $V_3$ and $V_4$ at time $t_3$, after which the observation window 302 is kept constant in the temperature range $[V_3, V_4]$.

Figure 3B:
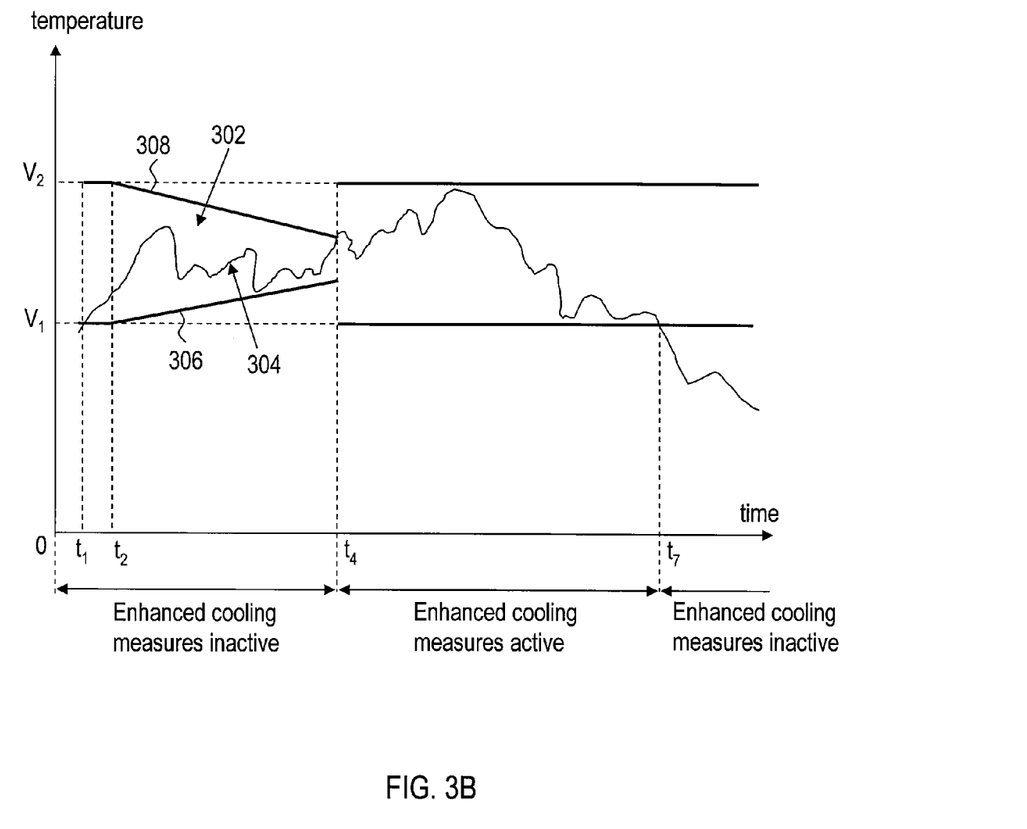
FIG. 3B is a schematic graph illustrating how the temperature of the processing unit may be monitored after it passes above an upper temperature threshold of the observation window, according to an embodiment of the present invention.

When the monitored temperature 304 reaches or exceeds the upper temperature threshold 308 at time $t_4$, which may occur when the observation window 302 is in the narrow temperature range $[V_3; V_4]$ (as shown in FIG. 3A), when it narrows in the time interval $[t_2; t_3]$ (as shown in FIG. 3B) or even before time $t_2$ (not shown), an interrupt signal is issued by the temperature controller 208 to indicate that enhanced cooling measures are necessary. After the monitored temperature 304 reaches the upper temperature threshold 308, the observation window 302 is reset to the initial large temperature range $[V_1; V_2]$ to continue to monitor the temperature 304.

As has been described above, the temperature controller 208 thus is able to monitor the temperature 304 of the processing unit 202 within an observation window 302 that can be controllably varied. Consequently, interrupt signals may be issued based on an observation of a trend of temperature variation in time rather than local instable fluctuations, which allows the implementation of enhanced cooling measures to work in a more efficient manner without on/off switch interruptions.

In conjunction with FIG. 2 and FIG. 3A, FIG. 3B is a schematic graph illustrating how the temperature 304 of the processing unit 202 may be monitored after it passes above the upper temperature threshold 308, according to an embodiment of the present invention. After the monitored temperature 304 passes above the upper temperature threshold 308 at time 4, the observation window 302 is reset to the larger temperature range $[V_1; V_2]$, and enhanced cooling measures are activated. When the monitored temperature 304 fluctuates between the lower temperature threshold 306 and the upper temperature threshold 308, the observation window 302 may be kept constant in the temperature range $[V_1; V_2]$. In this case, the enhanced cooling measures are maintained to cool down the processing unit 202 until the monitored temperature 304 drops below the lower temperature threshold 306 at time $t_7$, which triggers an interrupt signal from the temperature controller 206. In response to the interrupt signal, the enhanced cooling measures may then be deactivated.

Figure 3C:
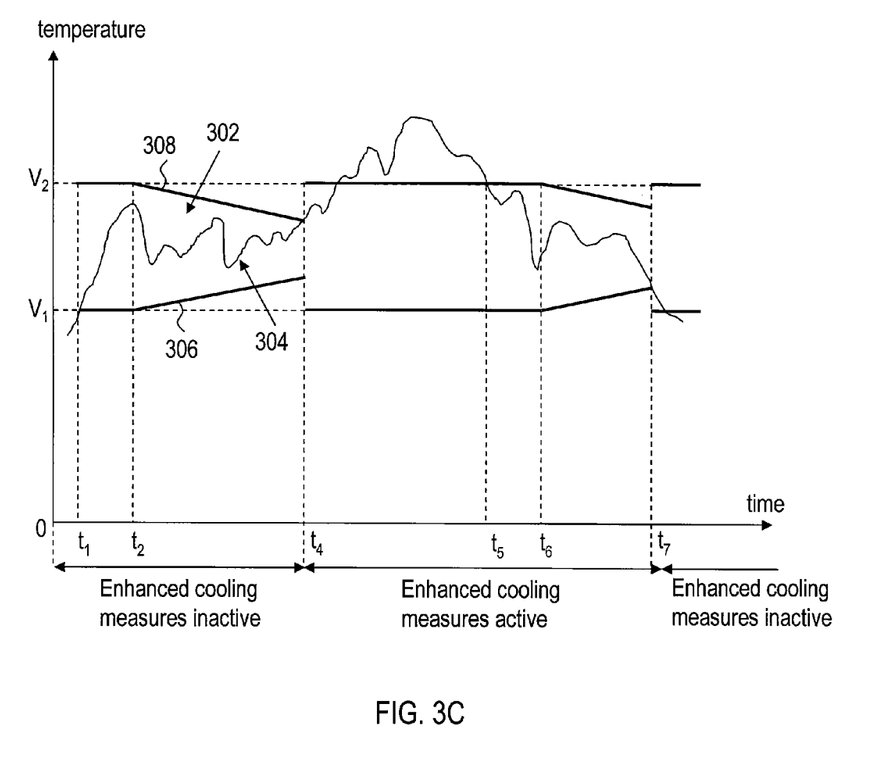
FIG. 3C is a schematic graph illustrating how the temperature of the processing unit may be monitored after it passes above an upper temperature threshold of the observation window, according to another embodiment of the present invention.
Figure 4:
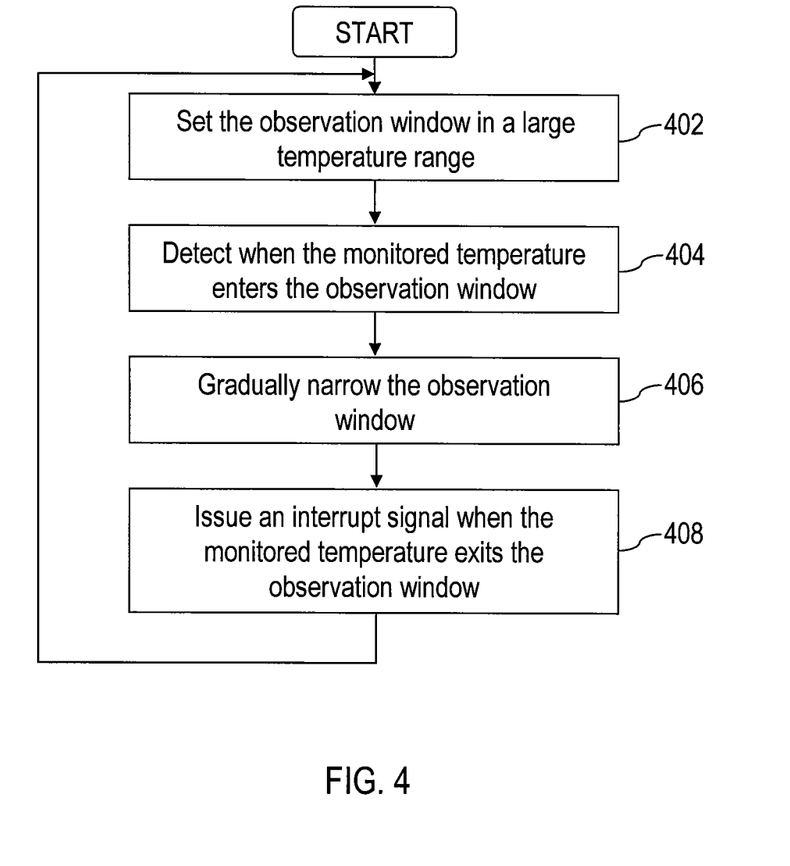
FIG. 4 is a flow chart of method steps for monitoring the temperature of a processing unit in operation, according to an embodiment of the present invention.

In conjunction with FIG. 2 and FIG. 3A, FIG. 3C is a schematic graph illustrating how the temperature 304 of the processing unit 202 may be monitored after it passes above the upper temperature threshold 308, according to another embodiment of the present invention. Like in the embodiment of FIG. 3B, after the monitored temperature 304 passes above the upper temperature threshold 308 at time 4, the observation window 302 is reset to the larger temperature range $[V_1; V_2]$, and enhanced cooling measures are activated. However, while the observation window 302 is kept constant in the temperature range $[V_1; V_2]$ after time $t_4$, the fluctuation of the monitored temperature 304 may exceed the upper temperature threshold 308 reset at the value $V_2$. Consequently, the temperature controller 208 may issue an interrupt signal again. In response, the same enhanced cooling measures may be kept active or further cooling actions may be taken. Subsequently, the next occurrence of the monitored temperature 304 dropping below the upper temperature threshold 308 at time $t_5$ will be detected by the temperature controller 208, which then will controllably narrow the observation window 302 at time $t_6$. While the observation window 302 narrows, the enhanced cooling measures are kept active to cool down the processing unit 202 as long as the monitored temperature 304 does not drop below the lower temperature threshold 306. When the monitored temperature 304 drops below the lower temperature threshold 306 at time $t_7$, the observation window 302 is reset to the large temperature range $[V_1; V_2]$, and another interrupt signal is issued by the temperature controller 208. The enhanced cooling measures then may be deactivated.

In conjunction with FIG. 2 and FIGS. 3A-3C, FIG. 4 is a flowchart of method steps for monitoring a temperature of a processing unit 202 in operation, according to an embodiment of the present invention. In initial step 402, the temperature controller 208 sets the observation window 302 in a large temperature range $[V_1; V_2]$. As the processing unit 202 operates, the temperature controller 208 in step 404 detects when the monitored temperature 304 of the processing unit 202 enters the observation window 302, such as by exceeding its lower temperature threshold 306, for example. In step 406, the temperature controller 208 then operates to gradually narrow the observation window 302. Various methods to narrow the observation window 302 have been described above. In step 408, the temperature controller 208 issues an interrupt signal when the monitored temperature 304 exits the observation window 302. The interrupt signal may indicate that the monitored temperature 304 has either exceeded the upper temperature threshold 308 or dropped below the lower temperature threshold 306. Step 402 may then be repeated to reset the observation window 302 to the large temperature range $[V_1; V_2]$, and steps 404-408 are then proceeded again to continue to monitor the temperature 304.

As has been described above, the method and system described herein thus are able to monitor the temperature of a processing unit within an observation window that can be controllably varied. Consequently, alert signals may be issued based on a trend of temperature variation in time rather than local instable fluctuations. As a result, the implementation of enhanced cooling measures can work in a more efficient manner without instable on/off switch interruptions.

The above description illustrates various embodiments of the present invention along with examples of how aspects of the present invention may be implemented. The above examples, embodiments, instruction semantics, and drawings should not be deemed to be the only embodiments, and are presented to illustrate the flexibility and advantages of the present invention as defined by the following claims.

I claim:

1. A method for monitoring a thermal dissipation from a processing unit, comprising:
   setting an observation window in a first temperature range;
   gradually narrowing the observation window from the first temperature range after a monitored temperature of the processing unit has entered the observation window; and
   issuing an interrupt signal when the monitored temperature exits the observation window.

2. The method of claim 1, wherein gradually narrowing the observation window includes timely decreasing an upper temperature threshold of the observation window.

3. The method of claim 1, wherein gradually narrowing the observation window includes timely increasing a lower temperature threshold of the observation window.

4. The method of claim 1, wherein gradually narrowing the observation window includes timely decreasing an upper temperature threshold of the observation window and at the same time timely increasing a lower temperature threshold of the observation window.

5. The method of claim 1, wherein gradually narrowing the observation window is performed until the observation window is in a second temperature range narrower than the first temperature range.

6. The method of claim 5, further including maintaining the observation window in the second temperature range as long as the monitored temperature does not exit the observation window.

7. The method of claim 1, further including resetting the observation window to the first temperature range after the interrupt signal is issued.

8. The method of claim 1, wherein the interrupt signal indicates that the monitored temperature has exceeded an upper temperature threshold of the observation window.

9. The method of claim 1, wherein the interrupt signal indicates that the monitored temperature has dropped below a lower temperature threshold of the observation window.

10. A system for monitoring a thermal dissipation from a processing unit, comprising:
    a temperature sensor; and
    a temperature controller configured to:
       set a temperature observation window in a first temperature range;
       gradually narrow the observation window from the first temperature range after a monitored temperature of the processing unit has entered the observation window; and
       issue an interrupt signal when the monitored temperature exits the observation window.

11. The system of claim 10, wherein the temperature controller is configured to timely decrease an upper temperature threshold of the observation window for gradually narrowing the observation window.

12. The system of claim 10, wherein the temperature controller is configured to timely increase a lower temperature threshold of the observation window for gradually narrowing the observation window.

13. The system of claim 10, wherein the temperature controller is configured to timely decrease an upper temperature threshold of the observation window and at the same time timely increase a lower temperature threshold of the observation window for gradually narrowing the observation window.

14. The system of claim 10, wherein the temperature controller is configured to gradually narrow the observation window until the observation window is in a second temperature range narrower than the first temperature range.

15. The system of claim 14, wherein the temperature controller is further configured to maintain the observation window in the second temperature range as long as the monitored temperature does not exit the observation window.

16. The system of claim 10 wherein the temperature controller is further configured to reset the observation window to the first temperature range after the interrupt signal is issued.

17. The system of claim 10, wherein the interrupt signal indicates that the monitored temperature has exceeded an upper temperature threshold of the observation window.

18. The system of claim 10, wherein the interrupt signal indicates that the monitored temperature has dropped below a lower temperature threshold of the observation window.

19. The system of claim 10, wherein the temperature controller is integrated in the processing unit.

20. The system of claim 10, wherein the processing unit is a graphics processing unit.

21. The system of claim 10, wherein:
- the interrupt signal is issued in response to the monitored temperature reaching an upper temperature threshold of the observation window, and
- the temperature controller is further configured to reduce a temperature of the processing unit in response to the interrupt signal.

22. The system of claim 21, wherein the temperature is reduced by increasing a speed of a fan in communication with the processing unit.

23. The system of claim 21, wherein the temperature is reduced by reducing a processing speed of the processing unit.

24. The method of claim 1, wherein:
- the interrupt signal is issued in response to the monitored temperature reaching an upper temperature threshold of the observation window, and
- the method further comprises reducing a temperature of the processing unit in response to the interrupt signal.

25. The method of claim 24, wherein the temperature is reduced by increasing a speed of a fan in communication with the processing unit.

26. The method of claim 24, wherein the temperature is reduced by reducing a processing speed of the processing unit.

* * * * *